2,992,866
REFINING MACHINE WITH AUTOMATICALLY COMPENSATED ADJUSTMENT PARTICULARLY FOR THE REFINING OF CHOCOLATE AND SIMILAR SUBSTANCES
Emilio Cavalieri, Via Neera 39, Milan, Italy
Filed Oct. 28, 1959, Ser. No. 849,223
Claims priority, application Italy Sept. 25, 1959
8 Claims. (Cl. 308—59)

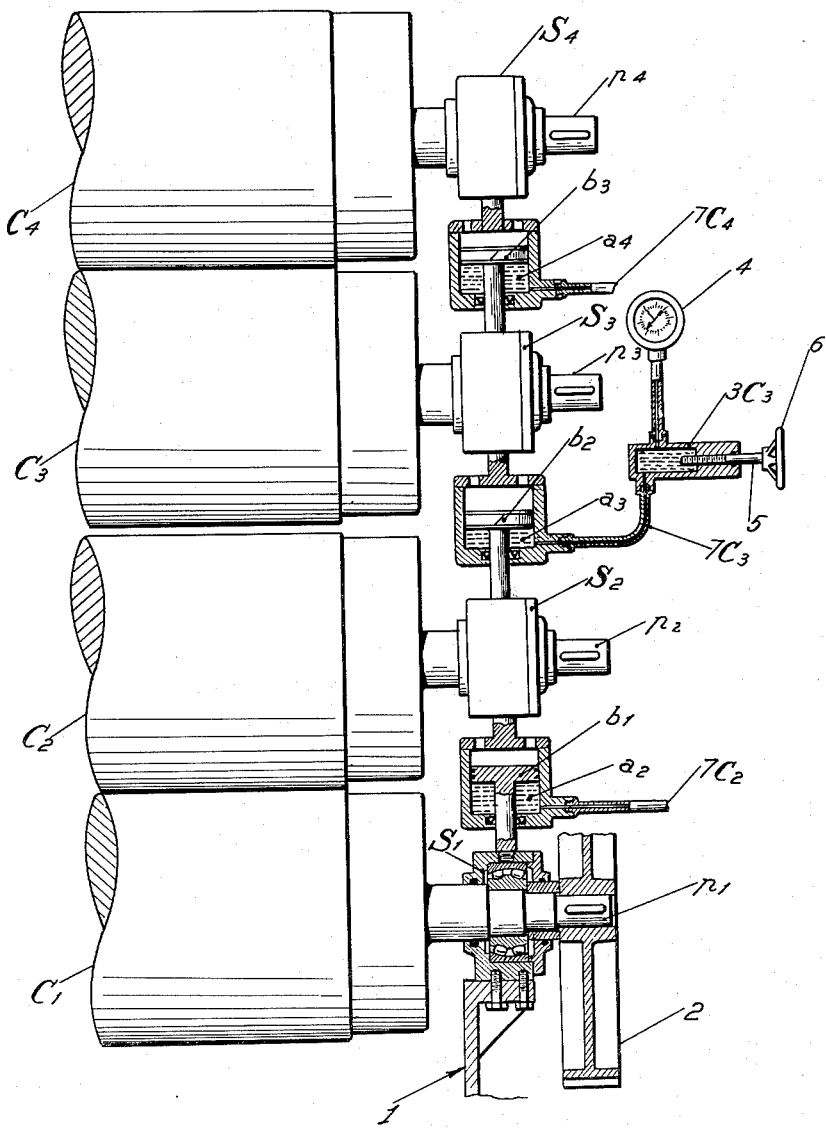

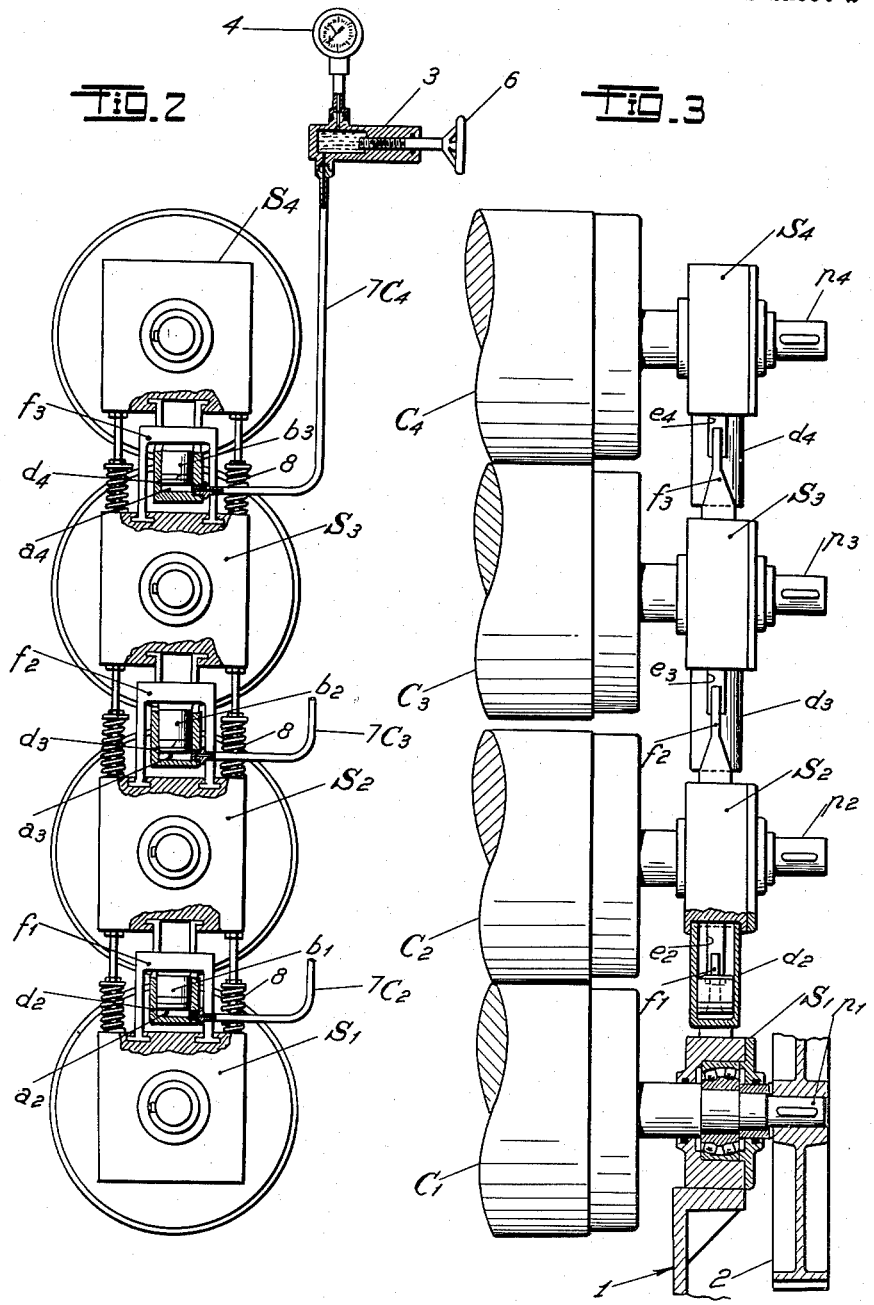

This invention relates to a refining machine with automatically compensated adjustment particularly for chocolate and similar substances.

As is well known, such machines consist of a series of rolling cylinders which can be adjusted with respect to a fixed cylinder. In order to adjust the pressure on the mixture to be refined with the greatest accuracy, the supports of the cylinder journals must be adjustable. Machines with hydraulic adjustment for the cylinder journal supports, as well as the mechanical adjustment type, are already well known. For instance it has been suggested that the two cylinder journal supports be mounted separately on pistons, each guided inside a cylinder filled with a hydraulic liquid and interconnected with an adjustment cylinder by a common pressure line. The volume of said adjustment cylinder can be altered by an adjustment screw so that the two support cylinders can be supplied equally with hydraulic liquid in order to vary the support adjustment. This device has the disadvantage that both cylinder supports are adjusted simultaneously and uniformly which, is some cases, can cause some inconvenience to the operation. In particular, if mixtures such as chocolate which contains components which are harder than others are being worked, it will be necessary to adjust the two cylinder supports separately so as to avoid breakages of machine parts. It is moreover necessary to alter the adjustment constantly since the quality of the product depends on the pressure exerted by the cylinders. The rolling cylinder adjustment required the greatest care on the part of the crew in attendance, but in spite of this it was extremely difficult to adjust the cylinder supports correctly and exactly to a certain pressure. For machines already on the market, it has been suggested that a manometer be fitted on the pressure line connecting the two operating cylinders effecting the support adjustment. It is not possible in this manner, however, to show the pressure at each support. In the machines which have an eccentric-type hydraulic adjustment device, the pressure at each support has already been indicated by a manometer. Apart from the fact that it was thus possible to know the support pressure on each side this arrangement presented the difficulty that one still had to proceed to the calculation of the pressure at the support since the manometer indicated only the adjustment pressure.

The machine according to the present invention is of the type with individually adjustable cylinder supports.

It has already been noted in practice, however that if a cylinder requires adjustment and said cylinder is in an intermediate position, it is also necessary to adjust the other cylinders. Since if the pressure between one pair of cylinders is altered this pressure is automatically transmitted by the mixture to the other cylinders. This would affect the pressure between said other cylinders and therefore the quality of the product would be impaired. It is therefore essential to carry out further adjustment of said other cylinders.

An aim that the machine according to the present invention proposes to achieve is to adjust the gap between a pair of cylinders and, therefore, the relative pressure, though leaving the gap unvaried, and therefore also the pressure, between the remaining pairs.

In the known machines moreover, the reaction to the force exerted by the hydraulic liquid had to be borne by the frame of the machine suitably equipped with crossbars to carry the pairs of journals one above the other. Said frame therefore had to be of very strong construction and was therefore heavy and expensive.

Another object that the machine according to the invention proposes to achieve is to simplify its construction.

This object, too, is attained in that the carrying structure can be of a much lighter construction in relation to what was required with previous machines in that the device for the hydraulic operation of the cylinders itself forms a supporting structure rigidly connecting the different pairs between themselves. This allows the designer to use a supporting structure which is much smaller and lighter and which has no need for intermediate crossbars since said structure no longer has to bear the stresses caused by the hydraulic liquid pressure when the hydraulic device operates the rolling cylinder supports.

These and further aims are attained by the machine conceived according to the present invention, which is essentially characterized by the provision of a plurality of rollers or revolving cylinders, each one having its journals freely turning within suitable supports, the rollers being series coupled and parallel, each of the said rollers being adjustable toward and away from the adjacent roller by means functionally integral with their respective journal supports, said adjustment means being hydraulically operable in a single direction, and there being provided for each hydraulically operating adjustment means a corresponding hydraulic operating device for the introduction of hydraulic fluid under pressure in the series coupling of the said adjustment means so that by adjusting or varying the pressure upon any one support, the correlated displacement is contemporaneously and automatically followed by the remaining series of supports whereby the respective distances between the remaining supports results unvaried and the correlative pressure between the other respective rollers also remains unvaried.

In a form of embodiment of the said refining machine each support of the journals of the intermediate rollers is provided with a piston and a hydraulic chamber, the said piston and hydraulic chamber being made functionally integral respectively with the hydraulic chamber and piston of the journal supports of continuous rollers, while each roller journal of the endmost rollers is provided with a piston or a hydraulic chamber designed respectively to cooperate with the hydraulic chamber or the piston as the case may be of the contiguous roller journals, within each of the said hydraulic chambers a pressure fluid having been introduced by means of an associated adjustable hydraulic pressure device.

The machine according to the present invention therefore affords an adjustment of the gap existing between a pair of rollers and consequently of the pressure, though leaving unaltered the gaps, and therefore the pressure, existing between the remaining pairs.

As will be evident to experts of the industry, the machine as conceived by the invention can have a number of different practical designs of which two types will be given purely as an example and not intended to demonstrate the limitations of the invention, and will be described in greater detail and illustrated by the accompanying drawings in which:

FIG. 1 shows a partial front view (with parts in section) of the machine as conceived by the invention in a first example of a practical application; whereas FIGS. 2 and 3 show, respectively, a transverse vertical section and a partial front view, with parts in section, of a second example, of a practical application.

The parts of the machines which are not of immediate interest to the present invention have been omitted from the accompanying drawings for the sake of clearness.

The machine as conceived by the present invention comprises a fixed frame 1, say four rolling cylinders $C_1$, $C_2$, $C_3$ and $C_4$, where the lower cylinder $C_1$ can, for instance be driven by a gear 2 rotated by a suitable motor (not shown). Each cylinder has, at each end, the journals $p_1$, $p_2$, $p_3$ and $p_4$ on which the corresponding gears for the transmission of motion (not shown) are fitted. The journals can rotate in the corresponding bearings $S_1$, $S_2$, $S_3$, and $S_4$ of which $S_1$ is fixed to the frame 1 whereas the others can be moved vertically in suitable guide rails (not shown) carried in the frame itself.

For the adjustment of the gap (bite) between the cylinders there is generally provided, according to the present invention, at least one hydraulic chamber or piston functionally integral with the cylinder supports of the endmost cylinder and a hydraulic chamber and a piston functionally integral with each journal of each adjacent pair of intermediate cylinders, there being provided for each hydraulic chamber an associated device comprising a hydraulic cylinder 3 (FIGS. 1 and 2) fitted with a manometer 4 within which cylinder a threaded piston 5 with an external hand wheel 6 can be micrometrically adjusted. The cylinder is connected by the line 7 to the lower part of the associated pressure chamber that is connected directly or indirectly to the bearing for the support of the associated journal.

In the embodiment of my invention according to FIG. 1, functionally integral with bearings $S_1$, $S_4$ there are provided, respectively, the piston $b_1$ and the hydraulic chamber $a_4$. The conduit $7C_4$ is connected to said hydraulic chamber $a_4$.

The bearing $S_2$, $S_3$ of the intermediate cylinders $C_2$, $C_3$ are functionally integral with hydraulic pistons and chambers, these consisting of a hydraulic chamber $a_2$ and a hydraulic piston $b_2$ for the cylinder $C_2$ and a hydraulic chamber $a_3$ and a hydraulic piston $b_3$ for the cylinder $C_3$.

The hydraulic chamber $a_2$ is fed by the conduit $7C_2$ which carries hydraulic fluid emitted by a hydraulic pressure device (not shown) while the hydraulic chamber $a_3$ is fed by the conduit $7C_3$ of the hydraulic pressure device $3C_3$ associated with the cylinder $C_3$.

It is thus evident that, except for the end bearings $S_1$ and $S_4$, each bearing (i.e. all of the intermediate ones, such as $S_2$ and $S_3$) has associated therewith a hydraulic chamber and a hydraulic piston, but each of such elements is so arranged that each hydraulic chamber of a bearing cooperates with the hydraulic piston of the contiguous bearing.

In the modified form of my invention shown in FIGS. 2 and 3, each hydraulic chamber $a_2$, $a_3$, $a_4$ is connected to its own bearing $S_2$, $S_3$, $S_4$ by a tubular connection element $d_2$, $d_3$, $d_4$ having upper windows $e_2$, $e_3$, $e_4$ for the passage of individual yokes $f_1$, $f_2$, $f_3$, functionally integral with their own bearings $S_1$, $S_2$, $S_3$ each of which yokes $f_1$, $f_2$, $f_3$ extends centrally and below its own piston $b_1$, $b_2$, $b_3$ between each bearing $S_1$, $S_2$, $S_3$, return springs 8 being provided.

After the above illustration, the operation of the parts of the refining machine as conceived by the present invention can be described as follows.

With reference to the example shown in FIG. 1, if, for instance, I wish to reduce the distance between cylinder $C_1$ and cylinder $C_2$, that is, bring together the bearings $S_1$ and $S_2$, hydraulic liquid is fed through the line $7C_2$ issuing in chamber $a_2$ and, since piston $b_1$ (slidable in the chamber $a_2$) will not move, chamber $a_2$ is lowered with its associated cylinder $C_2$. Since however the volume of the remaining liquid contained in the other chambers $a_3$ and $a_4$ will not change (because no liquid has been either added or removed and because the liquid is incompressible), it follows according to the invention, that the whole assembly $C_2$, $C_3$, $C_4$ will be lowered, since, as has been explained above, the chambers $a_3$ and $a_4$ are lowered by an amount equal to the displacement of the chamber $a_2$ and with bearings $S_3$ and $S_4$; in other words, the distances previously existing between the pairs of cylinders $C_2$, $C_3$ and $C_3$, $C_4$ remain unchanged. It is therefore evident that any adjustment is possible according to the invention without said adjustment altering the setting of the adjacent pairs of cylinders.

It should be understood that the present disclosure is for the purpose of illustration only and that this invention includes all modifications and equivalents which fall within the scope of the subject matter claimed.

What is claimed is:

1. A machine of the character described comprising, a plurality of rollers arranged in tandem and parallel relationship, each roller having end journals, a different bearing associated with each different journal and in which said journal is freely rotatable, said bearings being registered at opposite ends of the rollers, and means for adjusting each roller toward and away from the adjacent rollers, said adjusting means comprising a different hydraulic cylinder and piston located between and connecting the bearings of each adjacent pair of rollers at each set of ends of the rollers, the hydraulic cylinder being functionally integral with the bearing of one roller of the pair and the piston being functionally integral with the bearing of the other roller of the pair, and an individual means for controllably supplying hydraulic fluid under pressure to the hydraulic cylinder at an end of any pair of adjacent rollers, the ensuing displacement being concurrently and automatically followed by the remaining rollers whereby to maintain unvaried the spacings and pressures between said remaining rollers.

2. A machine as set forth in claim 1 wherein all the hydraulic cylinders are arranged for hydraulic operation in a single direction.

3. A machine as set forth in claim 1 wherein the same side of each piston is exposed to hydraulic pressure and the opposite side to the ambient atmosphere.

4. A machine as set forth in claim 1 wherein the individual means for controllably supplying hydraulic fluid to the different hydraulic cylinders each constitutes a micrometrically adjustable hydraulic pressure device fitted with a gauge.

5. A machine as set forth in claim 1 wherein each piston is connected to a bearing by a rigid element and wherein each cylinder is connected to each bearing by a rigid element.

6. A machine as set forth in claim 5 wherein the rigid element connecting each piston to a bearing extends through the end of the cylinder closest to said bearing.

7. A machine as set forth in claim 5 wherein the rigid element connecting a piston to a bearing extends through the end of the cylinder furthest from the bearing.

8. A machine as set forth in claim 1 wherein the rollers are vertically stacked.

References Cited in the file of this patent

UNITED STATES PATENTS 2,610,801    Miller               Sept. 16, 1952